United States Patent

Giovanetti et al.

[11] Patent Number: 5,108,594
[45] Date of Patent: Apr. 28, 1992

[54] AQUARIUM TRICKLE FILTER

[75] Inventors: Thomas A. Giovanetti; Thomas G. Hudson, both of Dallas; Jeffrey R. Watters, Rowlett, all of Tex.

[73] Assignee: Oceanic Systems, Inc., Garland, Tex.

[21] Appl. No.: 706,649

[22] Filed: May 29, 1991

[51] Int. Cl.⁵ .......................................... A01K 63/04
[52] U.S. Cl. ................................. 210/151; 210/169; 210/416.2; 210/175; 119/5; 261/94
[58] Field of Search ..................... 210/169, 416.9, 151; 119/4, 5; 261/94

[56] References Cited

U.S. PATENT DOCUMENTS 4,915,828  4/1990  Meyers et al. ................... 210/169
4,936,981  6/1990  Baisley et al. .................. 210/169
4,988,436  1/1991  Cole ................................ 210/169

*Primary Examiner*—Peter Hruskoci
*Assistant Examiner*—Robert James Popovics
*Attorney, Agent, or Firm*—Ross, Howison, Clapp & Korn

[57] ABSTRACT

An aquarium trickle filter for filtering aquarium water includes a housing. The housing includes an inlet for prefiltered aquarium water and an outlet for filtered aquarium water. Disposed within the housing is a chamber including filter elements. A drip tray having a top surface and edges is disposed adjacent the chamber to form a cover for the chamber. The drip tray top surface includes a plurality of grooves which include a plurality of apertures for allowing prefiltered aquarium water to enter the chamber and be uniformly dispersed over the filter elements. A channel is disposed adjacent to the chamber and in fluid communication with an aquarium. The channel is further disposed adjacent to a side wall of the housing. The channel includes an inlet and an outlet. Structure is disposed adjacent to the channel outlet for directing prefiltered aquarium water from the channel to the edges of the drip tray.

6 Claims, 3 Drawing Sheets

AQUARIUM TRICKLE FILTER

TECHNICAL FIELD OF THE INVENTION

The present invention relates to filtration systems for aquariums, and more particularly to a trickle filter.

BACKGROUND OF THE INVENTION

Aquarium filtration systems typically utilize a trickle filter for biological filtration of aquarium water. Such filters are utilized for biological conversion of ammonia and nitrite without the production of large quantities of nitrate. Mechanically filtered or prefiltered aquarium water enters the trickle filter for biological filtration. As used herein, the term "prefiltered" water refers to aquarium water that has had particulate matter removed through mechanical filtration devices, but which has not been biologically filtered.

Trickle filters typically utilize a spray or aquarium water dispersion system in order to distribute prefiltered aquarium water over the biomedia. However, such spray systems require rotating bars having associated maintenance and operational problems. Such rotating bar systems do not provide a uniform dispersion of prefiltered aquarium water over the biomedia and spray aquarium water outside the filtration system which is undesirable.

A need has thus arisen for a trickle filter for an aquarium filtration system which provides for uniform distribution of prefiltered water over a biomedia without the requirement of moving parts and their associated maintenance and operational problems.

SUMMARY OF THE INVENTION

In accordance with the present invention, an aquarium trickle filter for filtering aquarium water is provided. The filter includes a chamber having biological filter elements. A drip tray is disposed adjacent to the chamber to form a cover for the chamber. The drip tray top surface includes a plurality of grooves having a plurality of apertures for allowing prefiltered aquarium water to enter the chamber for uniform dispersion over the filter elements. Structure is provided for routing prefiltered aquarium water to the drip tray adjacent the edges of the drip tray to thereby form a thin sheet of prefiltered aquarium water over the top surface of the drip tray.

In accordance with another aspect of the present invention, an aquarium trickle filter for biologically filtering aquarium water is provided. The trickle filter includes a housing having first and second spaced apart end walls and first and second spaced apart side walls. The housing includes an inlet for prefiltered aquarium water and an outlet for biologically filtered aquarium water. Disposed within the housing is a chamber including filter elements. A drip tray having a top surface and edges is disposed adjacent the chamber to form a cover for the chamber. The drip tray top surface includes a plurality of grooves which include a plurality of apertures for allowing prefiltered aquarium water to enter the chamber and be uniformly dispersed over the biological filter elements. A channel is disposed adjacent to the chamber and in fluid communication with an aquarium. The channel is further disposed adjacent to the first side wall of the housing. The channel includes an inlet and an outlet. Structure is disposed adjacent to the channel outlet for directing prefiltered aquarium water from the channel to the edges of the drip tray.

In accordance with another aspect of the present invention, a drip tray for a trickle filter is provided. The tray includes a top surface having a plurality of grooves. The plurality of grooves include a plurality of apertures for uniformly dispersing prefiltered aquarium water over the surface of the drip tray. The grooves are disposed perpendicularly to one another and are V-shaped in cross section.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
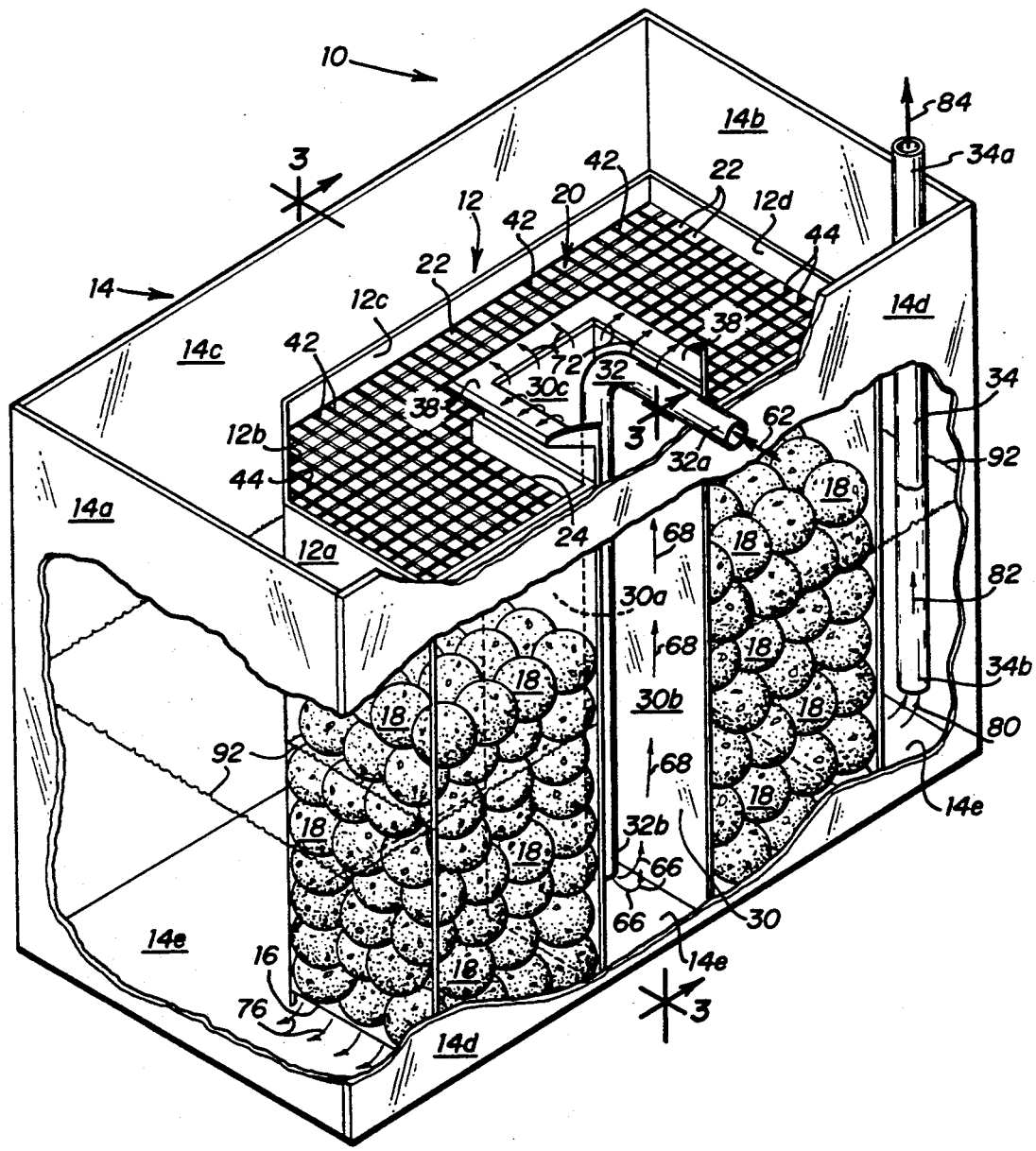
FIG. 1 is a perspective view of the present aquarium trickle filter.
Figure 2:
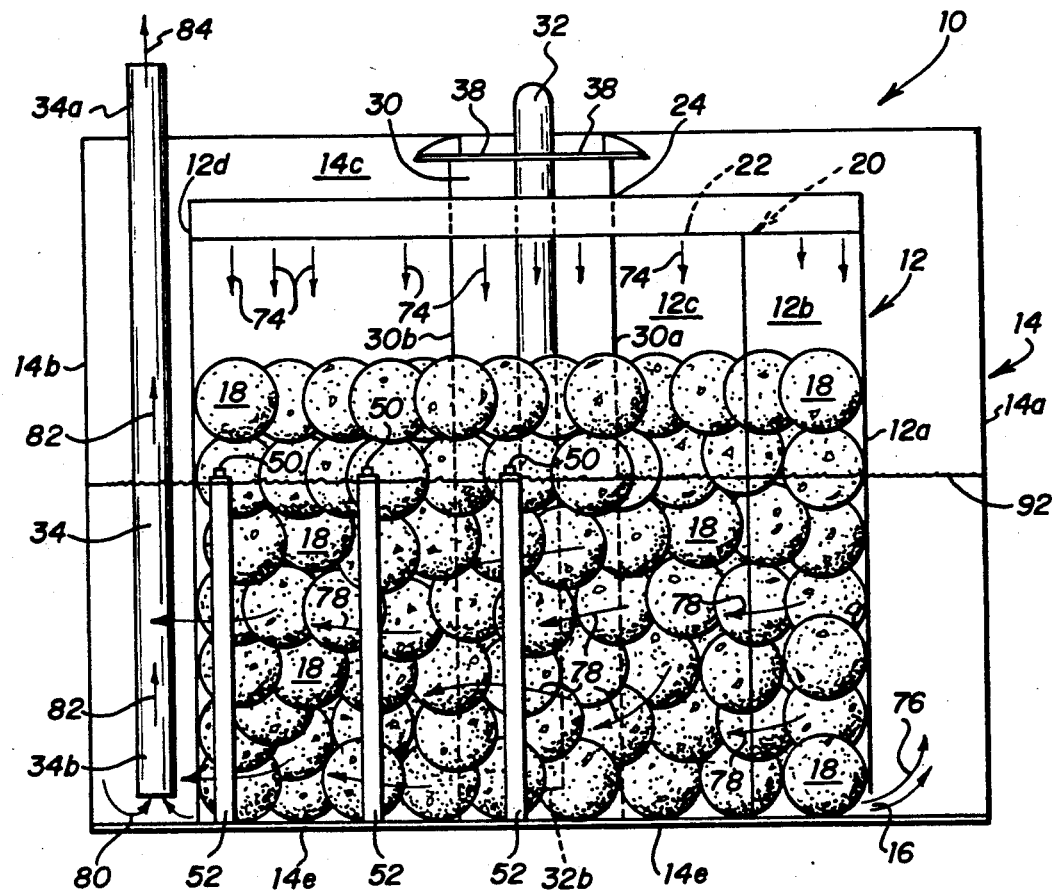
FIG. 2 is a front elevational view of the present aquarium trickle filter.

Referring simultaneously to FIGS. 1 and 2, the present aquarium trickle filter is illustrated, and is generally identified by the numeral 10. Trickle filter 10 includes a chamber generally identified by the numeral 12 which is disposed within a housing generally identified by the numeral 14. Chamber 12 includes side walls 12a, 12b, 12c, and 12d. Housing 14 includes end walls 14a and 14b and side walls 14c and 14d. Housing 14 further includes a bottom wall 14e which also forms a bottom wall for chamber 12. Side wall 12a of chamber 12 does not extend to bottom wall 14e of housing 14, thereby forming a gap 16 between side wall 12a and bottom wall 14e. Chamber side walls 12b, 12c, and 12d all extend to bottom wall 14e of housing 14. Side wall 14d of housing 14 functions to provide a side wall for chamber 12 such that chamber 12 encloses a plurality of biosphere biomedia 18. Biosphere biomedia 18 provides a large surface area and degassing ability in a non-clogging media for trickle filter 10.

An important aspect of the present invention is the use of a drip tray 20. Drip tray 20 functions as a removable cover for chamber 12 and uniformly disperses prefiltered aquarium water over biomedia 18. Drip tray 20 includes a top surface 22 and edges 24. A specific embodiment of drip tray 20 will subsequently be described.

Disposed adjacent to side wall 14d of housing 14 and adjacent to chamber 12 is a channel 30. Channel 30 defines a column of prefiltered aquarium water which is routed to top surface 22 of drip tray 20. Channel 30 includes side walls 30a, 30b, and 30c which extend to bottom wall 14e at housing 14. Disposed within channel 30 is a conduit 32 having ends 32a and 32b. End 32a is in fluid communication with an aquarium (not shown) for delivering prefiltered aquarium water to trickle filter 10. Prefiltered aquarium water exits from end 32b of conduit 32 into channel 30. Aquarium water once filtered by trickle filter 10 returns to the aquarium via a conduit 34 having ends 34a and 34b. End 34a of conduit 34 is in fluid communication with the aquarium. Filtered aquarium water enters conduit 34 from end 34b and is returned to the aquarium using a pump (not shown) either external or internal to housing 14.

Prefiltered aquarium water having entered channel 30 is routed to edges 24 of drip tray 20 via a spillway 38. Spillway 38 causes prefiltered aquarium water to gradually and evenly flow onto drip tray 20. The prefiltered aquarium water rises above drip tray 20 because channel 30 forms a column of prefiltered aquarium water contained between side walls 30a, 30b, and 30c of channel 30 and side wall 14d of housing 14.

Figure 4:
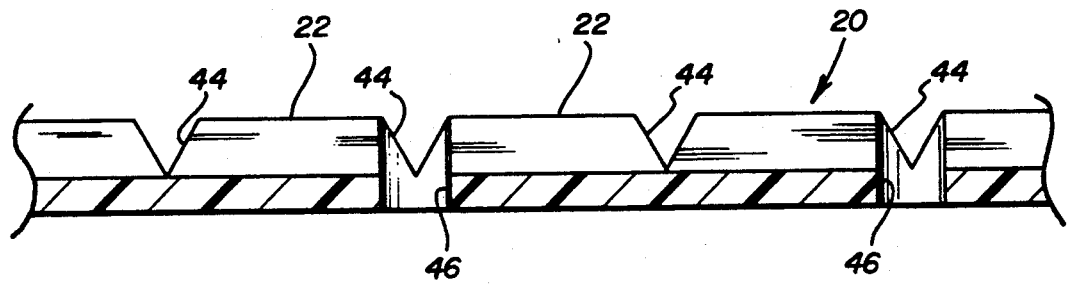
FIG. 4 is a cross-sectional view taken generally along sectional lines 4—4 of FIG. 3.

Referring simultaneously to FIGS. 1 AND 4, drip tray 20 includes a first plurality of grooves 42 which are disposed parallel to edges 24 of drip tray 20. Drip tray 20 further includes a second plurality of grooves 44 which are disposed perpendicular to edges 24 of drip tray 20. Grooves 42 and 44 function to evenly disperse prefiltered aquarium water over the entire top surface 22 of drip tray 20, particularly at low flow rates. Disposed within grooves 42 and 44 are apertures 46 which allow prefiltered aquarium water to enter chamber 12 to undergo biological filtration due to the action of biomedia 18.

Figure 3:
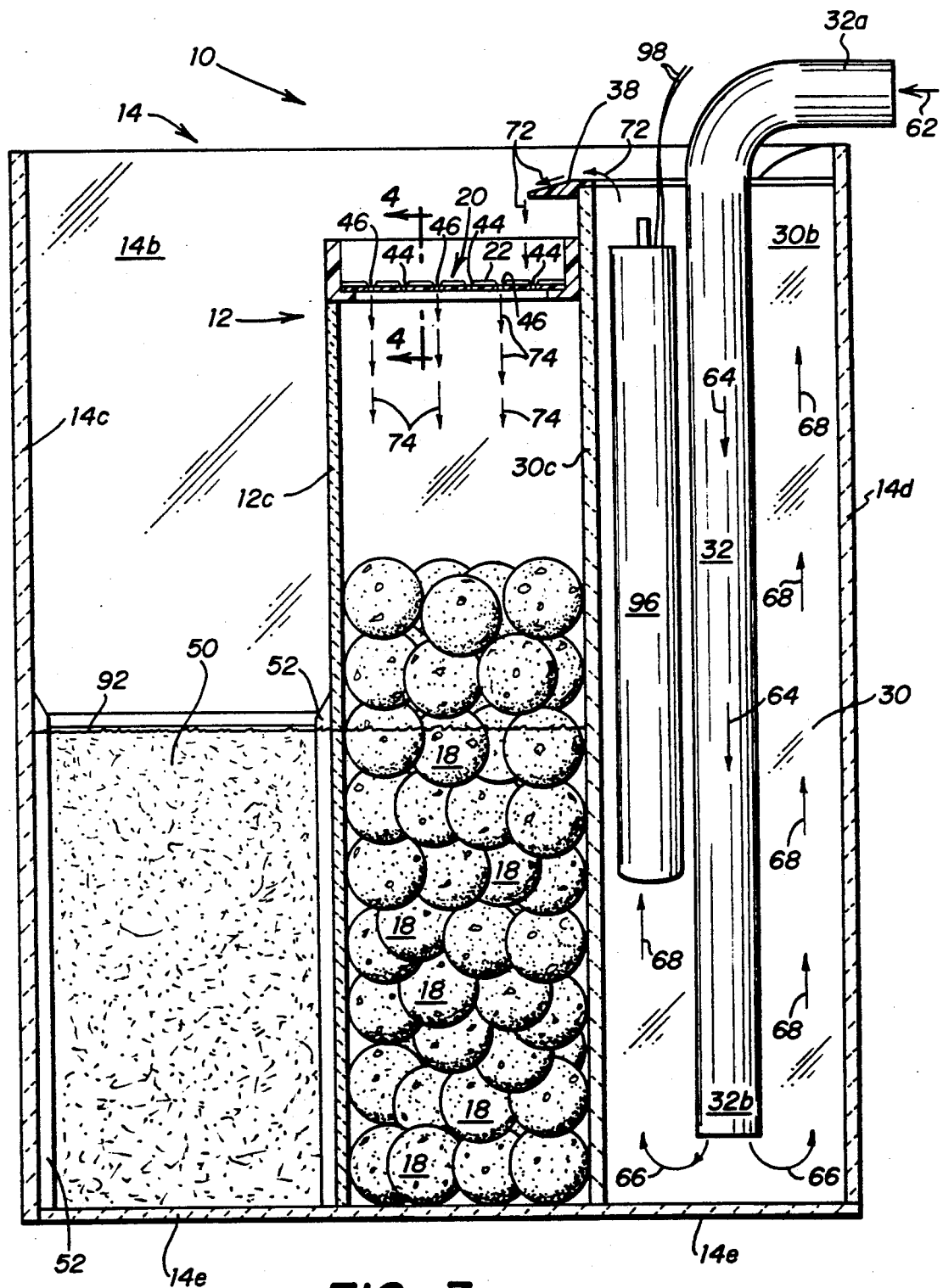
FIG. 3 is a cross-sectional view taken generally along sectional lines 3—3 of FIG. 1.

Referring simultaneously to FIGS. 2 and 3, housing 14 further includes a plurality of filter elements 50 which are disposed between side wall 14c of housing 14 and side wall 12c of chamber 12. Filters 50 provide additional filtration of aquarium water after the aquarium water has exited from chamber 12. Filters 50 are supported between housing 14 in chamber 12 utilizing tracks 52.

Referring again to FIGS. 1, 2, and 3, the flow of aquarium water from an aquarium to and through trickle filter 10 and back to the aquarium will now be described. Prefiltered aquarium water enters conduit 32 at end 32a, indicated by arrow 62. The prefiltered aquarium water passes through conduit 32 indicated by arrow 64 (FIG. 3) and exits from conduit 32 at end 32b illustrated by arrows 66. The prefiltered aquarium water rises within channel 30 indicated by arrows 68 to the level of spillway 38 above drip tray 20. The prefiltered aquarium water passes over spillway 38 indicated by arrows 72. The prefiltered aquarium water then passes through drip tray 20 apertures 46 indicated by arrows 74. The aquarium water then passes through biomedia 18 and exits chamber 12 via gap 16 to enter housing 14. Arrows 76 indicate the flow of biomedia filtered water exiting from chamber 12 into housing 14.

Aquarium water then flows between housing 14 side wall 14c and chamber 12 side wall 12c through filter elements 50 indicated by arrows 78 (FIG. 2). The now completely filtered aquarium water via a pump enters conduit 34 at end 34b indicated by arrows 80. The now completely filtered aquarium water then passes through conduit 34 at end 34b indicated by arrows 82 to thereafter exit conduit 34 at end 34a indicated by arrow 84 to return to the aquarium. It therefore can be seen that partially filtered aquarium water enters housing 14 adjacent to housing end wall 14a, and exits from housing 14 at a point adjacent end wall 14b of housing 14. In this manner, aquarium water passes entirely through housing 14 to ensure passage of aquarium water through multiple filters 50. The biologically filtered aquarium water flows through filter elements 50 rather than just accumulating and stagnating in housing 14. This flow pattern prevents an accumulation of debris within filter 10.

The flow rate of aquarium water through housing 14 is maintained such that housing 14 is approximately one-third full indicated by water level 92. Although housing 14 is maintained partially full, channel 30 is completely full to create a rising column of prefiltered aquarium water which rises above drip tray 20 for dispersion by drip tray 20 into chamber 12. A uniform thin sheet of prefiltered aquarium water is thereby created on the surface 22 of drip tray 20 for uniform dispersion over biomedia 18 within chamber 12.

Also disposed within channel 30 is a submersible heater 96 (FIG. 3) for heating aquarium water as it passes through trickle filter 10. Heater 96 is connected to a power source via connections 98. Since channel 30 maintains a column of water even if the supply of prefiltered aquarium water is terminated from the aquarium, heater 96 will always be submerged to prevent overheating and/or damage to heater 96 which would otherwise occur in the event that heater 96 was not submerged in water.

Housing 14 and chamber 12 are configured such that a protein skimmer (not shown) can be accommodated within housing 14 adjacent to side wall 12b of chamber 12. Housing 14 and chamber 12 may be composed of, for example, smoked glass to allow for visual inspection within trickle filter 10 but maintain a darkened environment for bacterial proliferation.

It therefore can be seen that the present invention provides for a trickle filter which generates a uniform thin sheet of water for dispersion over biomedia without the requirement of rotating spray bars or other structure having moving parts requiring continual maintenance and replacement. The present trickle filter also accommodates additional filtration of aquarium water which has been filtered by the biomedia. This additional filtration takes place within a compact housing which has a large sump capacity. The present trickle filter also accommodates a heater and protein skimmer.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. An aquarium trickle filter for filtering aquarium water comprising:

a housing having first and second spaced apart end walls and first and second spaced apart side walls;

said housing including an inlet for receiving prefiltered aquarium water and an outlet for filtered aquarium water;

a pump for transferring filtered aquarium water from said housing to an aquarium;

a chamber disposed within said housing and including a filter element;

a tray having a top surface and edges and being disposed adjacent to said chamber to form a top for said chamber, said tray top surface including a plurality of apertures for allowing prefiltered aquarium water to enter said chamber and be uniformly dispersed over said filter element;

a channel disposed within said housing between said first and second end walls and adjacent said first side wall of said housing and further disposed adjacent said chamber, said channel having an inlet in fluid communication with said housing inlet and having an outlet; and means disposed adjacent said channel outlet for directing prefiltered aquarium water from said channel to said tray edges to thereby form a thin sheet of prefiltered aquarium water on said tray top surface.

2. The trickle filter of claim 1, wherein said chamber includes an outlet for filtered aquarium water, said chamber outlet being disposed adjacent said housing first end wall an said housing outlet being disposed adjacent said housing second end wall.

3. The trickle filter of claim 1 and further including: a plurality of filter elements disposed within said housing between said chamber outlet and said housing outlet.

4. The trickle filter of claim 1, wherein said tray includes a first plurality of grooves and a second plurality of grooves perpendicularly disposed to said first plurality of grooves and said plurality of apertures being disposed with said grooves.

5. The trickle filter of claim 4, wherein said first and second plurality of grooves have a V-cross-sectional shape.

6. The trickle filter of claim 1 and further including: a heater disposed within said channel.

* * * * *